(12) United States Patent
Lee et al.

(10) Patent No.: US 7,142,740 B2
(45) Date of Patent: Nov. 28, 2006

(54) PLANAR LIGHTWAVE CIRCUIT TYPE OPTICAL TRANSCEIVER MODULE

(75) Inventors: Jong Moo Lee, Daejeon (KR); Sun Tak Park, Daejeon (KR); Joon Tae Ahn, Daejeon (KR); Yong Soon Baek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/188,302

(22) Filed: Jul. 25, 2005

(65) Prior Publication Data

US 2006/0051030 A1 Mar. 9, 2006

(30) Foreign Application Priority Data

Sep. 9, 2004 (KR) .................. 10-2004-0071973

(51) Int. Cl.
*G02B 6/00* (2006.01)
*G02B 6/12* (2006.01)
*G02B 6/26* (2006.01)

(52) U.S. Cl. .................. 385/14; 385/47; 385/50
(58) Field of Classification Search .................. 385/14
See application file for complete search history.

(56) References Cited

U.S. PATENT DOCUMENTS

| 5,031,984 | A | | 7/1991 | Eide et al. |
| 5,799,120 | A | * | 8/1998 | Kurata et al. .................. 385/45 |
| 6,480,639 | B1 | | 11/2002 | Hashimoto et al. |
| 6,868,210 | B1 | * | 3/2005 | Takahashi et al. ............ 385/50 |
| 2004/0228573 | A1 | * | 11/2004 | Terakawa et al. ............. 384/24 |
| 2005/0008281 | A1 | * | 1/2005 | Higuchi et al. ............... 385/14 |
| 2005/0100273 | A1 | * | 5/2005 | Kim et al. .................... 385/24 |

FOREIGN PATENT DOCUMENTS

| JP | 63-33707 | * | 2/1988 |
| JP | 63-33708 | * | 2/1988 |
| JP | 8190026 | | 7/1996 |
| JP | 11 068705 | | 3/1999 |
| JP | 11248977 | | 9/1999 |

OTHER PUBLICATIONS

"Filter-Embedded Wavelength-Division Multiplexer for Hybrid-Integrated Transceiver Based on Silica-Based PLC" Inoue et al., Electronic Letters, Apr. 25, 1996, vol. 32, No. 9 pp. 847-848.

(Continued)

*Primary Examiner*—Michelle Connelly-Cushwa
(74) *Attorney, Agent, or Firm*—Ladas & Parry LLP

(57) ABSTRACT

Provided is a planar lightwave circuit (PLC) type optical transceiver module, in which for a diplex optical transceiver module that uses different wavelengths in upstream and downstream, an optical waveguide connected to a light-receiving unit is a multi-mode waveguide and an optical waveguide connected to the light-emitting unit is a single mode waveguide, and further, for a triplex optical transceiver module that uses one upstream wavelength and more than two different downstream wavelengths, an optical waveguide connected to the light-receiving unit, which is a waveguide-type photo diode, is a multi-mode waveguide and an optical waveguide connected to the light-emitting unit is a single mode waveguide, whereby even when there is an alignment error of a thin film filter due to irregularity provided in forming a trench, the optical waveguide connected to the light-receiving unit is formed wider than the optical waveguide connected to the light-emitting unit so that the loss during transmission of the optical signal to the light-receiving unit is minimized.

13 Claims, 6 Drawing Sheets

OTHER PUBLICATIONS

"A New Concept for the WDM Module Using a Waveguide Equipped with Filter" Miyashita et al., WF6-1/97.

"Passive Aligned Hybrid Integrated WDM Transceiver Module Using Planar Lightwave Circuit Platform" Okano et al., IEICE Trans. Electron., vol. E80-C, No. 1 Jan. 1997, pp. 112-116.

* cited by examiner

PLANAR LIGHTWAVE CIRCUIT TYPE OPTICAL TRANSCEIVER MODULE

CROSS-REFERENCE TO RELATED APPLICATION

This application claims priority to and the benefit of Korean Patent Application No. 2004-71973, filed Sep. 9, 2004, the disclosure of which is incorporated herein by reference in its entirety.

BACKGROUND

1. Field of the Invention

The present invention relates to an optical transceiver module applicable to a diplex or a triplex type optical transceiver for Ethernet PON or GPON and the like and, more specifically, to a planar lightwave circuit type optical transceiver module using a wavelength division multiplexing (WDM) scheme.

2. Discussion of Related Art

Recently, a planar lightwave type optical transceiver module has been developed up to a commercialized level, and it is expected that a low-cost planar lightwave type optical transceiver module will be widely used in optical communication subscriber networks.

The optical transceiver module can be used as a diplex transceiver for a broadband passive optical network (BPON) communications using a couple of upstream and downstream wavelengths or, as a triplex transceiver using an upstream wavelength and two distinguished downstream wavelengths. The BPON is expected to be developed into gigabit Ethernet PON or GPON in the very near future.

A conventional planar lightwave circuit type optical diplex transceiver module includes a light-emitting unit, a light-receiving unit, and single mode waveguides, and they are integrated into a substrate made of ceramic material or silicon material such as a Si wafer. An optical waveguide is formed on a substrate to face the light-emitting unit, and the other optical waveguide is formed on the substrate to face the light-receiving unit. Here, the optical waveguides are arranged adjacent to each other at a predetermined portion, and a thin film filter (TFF) is arranged at the predetermined portion to transfer optical signals to the light-receiving unit or from the light-emitting unit depending on the wavelength.

In the optical transceiver module arranged as described above, the thin film filter is inserted into a trench formed on the substrate. However, the trench is typically formed using a sawing process, so that it is difficult to be finely formed due to a characteristic of the process. In other words, a location and a gap of the trench may be formed irregularly.

A reflection plane of the thin film filter should be exactly aligned to a place at which two optical waveguides are adjacent to transmit the optical signals transmitted from an optical fiber to the light-receiving unit with a minimal loss. When the trench is not exactly formed as described above, however, the reflection plane of the thin film filter can be out of a proper position leading to a severe loss of the optical signal.

To maintain the optical signal loss depending on the location of the thin film filter below 1 dB, there is difficulty in that the location of the thin film filter should be adjusted within an error range of ±1 μm for an excessive case (when an incident angle is large). Moreover, for a case where more than two thin film filters should be inserted, as in the triplex type optical transceiver, the loss depending on the location of the filter is more critical.

SUMMARY OF THE INVENTION

The present invention is directed to a planar lightwave circuit type optical transceiver module capable of effectively preventing a loss according to a positioning error of a wavelength selection thin film filter.

The present invention is also directed to a planar lightwave circuit type optical transceiver module in a triplex arrangement that is expected to be applicable in the near future.

One aspect of the present invention is to provide a planar lightwave circuit type optical transceiver module comprising: a substrate; a light-emitting unit and a light-receiving unit arranged on the substrate; a first optical waveguide having a core and a clad, and formed on the substrate to face the light-emitting unit; a second optical waveguide having a core and a clad, and formed on the substrate to face the light-receiving unit; and a filter located at a portion where the first optical waveguide and the second optical waveguide are adjacent, for transmitting or reflecting an optical signal according to a wavelength, wherein the first optical waveguide is a single mode waveguide and the second optical waveguide is a multimode waveguide.

Another aspect of the present invention is to provide a planar lightwave circuit type optical transceiver module comprising: a substrate; a light-emitting unit arranged on the substrate; a plurality of light-receiving units arranged on the substrate; a first optical waveguide having a core and a clad, and formed on the substrate to face the light-emitting unit; a plurality of second optical waveguides, each having a core and a clad, and formed on the substrate to face the plurality of light-receiving units; and a plurality of filters, each located at a portion where the first optical waveguide and the second optical waveguide are adjacent, for transmitting or reflecting an optical signal according to a wavelength, wherein the first optical waveguide is a single mode waveguide and the second optical waveguide is a multimode waveguide.

The second optical waveguide may have a larger core width than the first optical waveguide, and have a larger core thickness than the first optical waveguide.

The first optical waveguide and the second optical waveguide may be adjacent with a gap of 3 to 15 μm.

The filter may be inserted into a trench formed on the substrate, and the trench may be formed with a depth of 100 to 300 μm and a width of 10 to 40 μm.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

According to the present invention, for a diplex optical transceiver module that uses different wavelengths in upstream and downstream, an optical waveguide connected to a light-receiving unit is a multi-mode waveguide and an optical waveguide connected to the light-emitting unit is a single mode waveguide. In addition, for a triplex optical transceiver module that uses one upstream wavelength and two separate downstream wavelengths, an optical waveguide connected to the light-receiving unit is a multi-mode waveguide and an optical waveguide connected to the light-emitting unit is a single mode waveguide. Thus, according to the optical transceiver module of the present invention, even when there is an alignment error of a wavelength selection thin film filter, the loss during transmission of the optical signal propagating to the light-receiving unit is minimized.

Exemplary embodiments of the present invention will now be described in detail with reference to the accompanying drawings.

Figure 1:
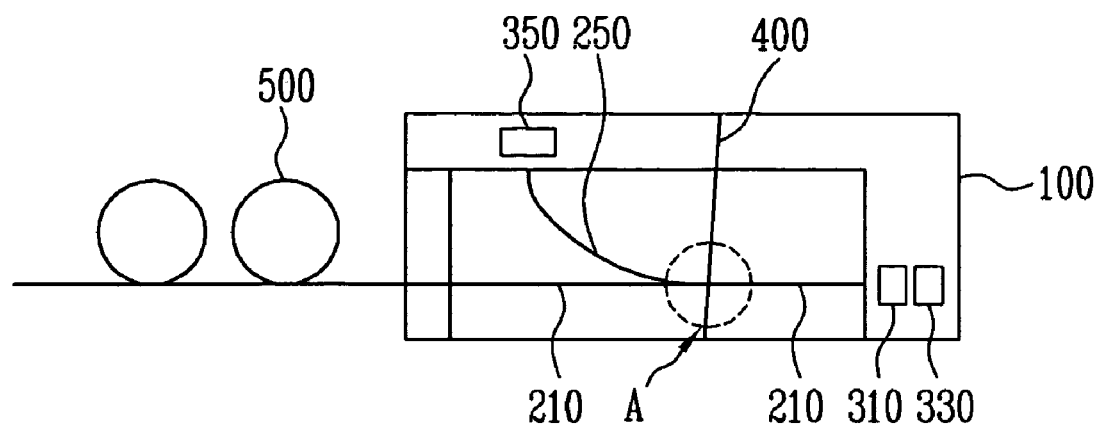
FIG. 1 is a schematic diagram for illustrating a planar lightwave circuit (PLC) type optical transceiver module according to an embodiment of the present invention.

FIG. 1 is a schematic diagram for illustrating a planar lightwave circuit (PLC) type optical transceiver module according to an embodiment of the present invention, and is described with reference to FIGS. 2 and 3.

The planar lightwave circuit type optical transceiver module according to the present embodiment, which is a diplex one that uses different wavelengths for the upstream and the downstream, is integrated into a substrate 100 made of semiconductor or ceramic material. Light-emitting units 310 and 330 are arranged on one side of the substrate 100, and a light-receiving unit 350 is arranged on the other side. In addition, a first optical waveguide 210 is formed on the substrate 100 to face the light-emitting units 310 and 330, and a second optical waveguide 250 is formed to face the light-receiving unit 350. Here, the first optical waveguide 210 and the second optical waveguide 250 are adjacent to each other at a predetermined portion (A portion) with a constant gap g1, and a thin film filter 450 for transmitting or reflecting optical signals according to a wavelength is arranged at the portion (A portion) where the first optical waveguide 210 and the second optical waveguide 250 are adjacent. The thin film filter 450 is inserted into a trench 400 formed on the substrate 100 through a sawing process.

The light-emitting units 310 and 330 include a light-emitting device 310 such as a laser diode and a monitoring diode such as a monitoring photodiode for monitoring laser, and the light-receiving unit 350 includes a light-receiving device 330 such as a photodiode. In FIG. 1, while the light-receiving unit 350 and the light-emitting units 310 and 330 are formed on the sides of the substrate 100, locations herein may be interchanged, if necessary, and may be arranged at any other location.

Figure 2:
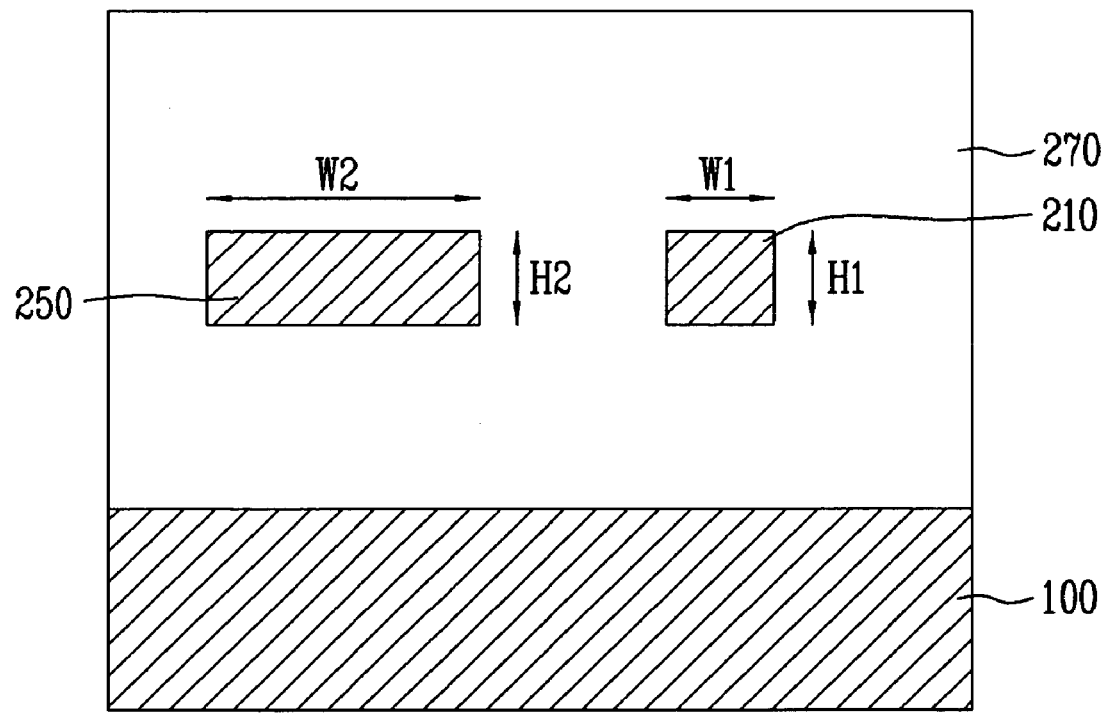
FIG. 2 is a cross sectional view for illustrating an optical waveguide shown in FIG. 1.

Each of the first and second optical waveguides 210 and 250 has a clad 270 made of silica or polymer and formed on the substrate 100 as shown in FIG. 2, and a core 210 and 250 formed in a rectangular cross section. Here, a width W1 of the first optical waveguide 210 formed in a single mode waveguide is approximately 2 to 10 μm, and a width W2 of the second optical waveguide 250 formed in a multi-mode waveguide is approximately 10 to 40 μm which is larger than the width W1 of the first optical waveguide 210. In addition, the first optical waveguide 210 and the second optical waveguide 250 are arranged to have an angle 2θ of 16 to 90 degrees. A waveguide-type photo-diode is recommended for the light-receiving unit to satisfy a simple and economical integration with the planar light waveguide platform.

In the present embodiment, the first and second optical waveguides 210 and 250 do not contact with each other at the adjacent portion (A portion) but separated by a constant gap g1. When the first and second optical waveguides 210 and 250 contact with each other, the optical signal output from the light-emitting units 310 and 330 may be leaked at a point where the first optical waveguide 210 formed in a single mode waveguide and the second optical waveguide 250 formed in a multi-mode waveguide join. To prevent it, the first and second optical waveguides 210 and 250 are arranged such that they are separated by a narrow gap g1. Here, the gap g1 is preferably 3 to 10 μm. Like this, if the gap g1 is maintained in approximately 10 μm, the loss is not significantly increased even when the thickness H1 of the first optical waveguide 210 and the thickness H2 of the second optical waveguide 250 are substantially the same. However, in order to prevent the loss more reliably, it is desirable that the thickness H2 of the second optical waveguide 250 formed in the multi-mode waveguide be formed thicker than the thickness H1 of the first optical waveguide 210 formed in the signal mode waveguide.

The thin film filter 450 has a thickness of 10 to 30 μm. In addition, the trench 400 into which the thin film filter 450 is inserted has a depth of approximately more than 100 μm, and preferably, 100 to 300 μm and a width g2 is formed such that it is larger than the thickness of the thin film filter 450 by 2 to 10 μm, so as to be, for example, 12 to 40 μm.

Operation of the planar lightwave circuit type optical transceiver module according to the present invention as described above will be illustrated.

An optical fiber 500 is coupled to the first optical waveguide 210, so that the optical signal input through the first optical waveguide 210 is reflected to the thin film filter 450 according to a wavelength and transmitted to the light-receiving unit 350, and the optical signal generated from the light-emitting units 310 and 330 is transmitted to the thin film filter 450 and output to the optical fiber 500 through the first optical waveguide 210.

Figure 3:
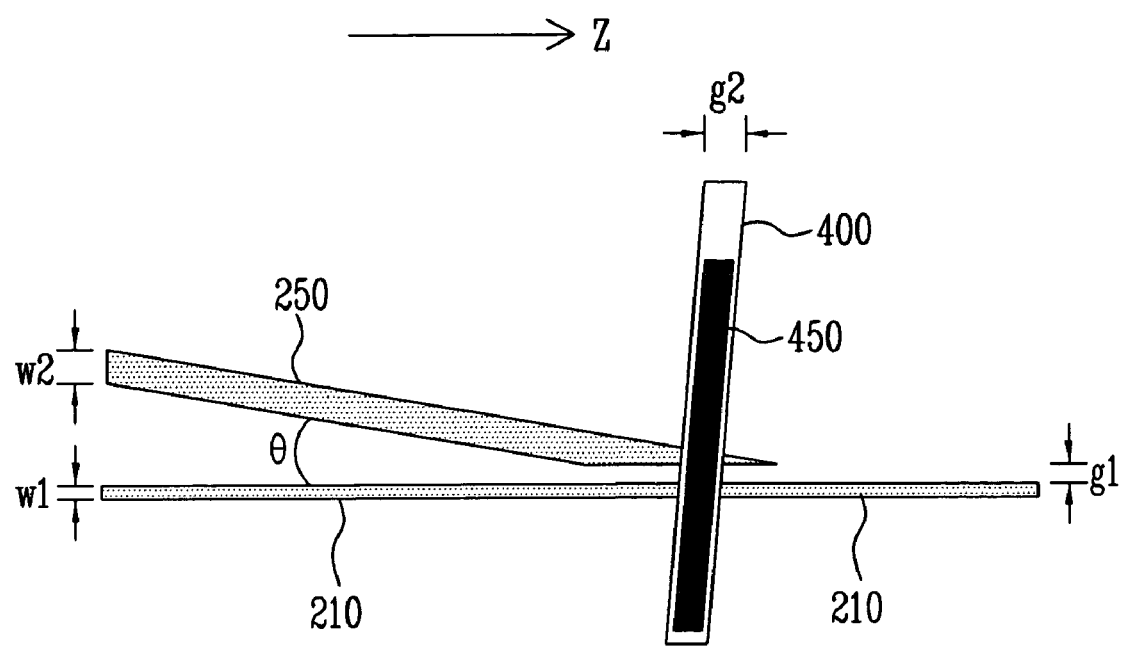
FIG. 3 is a detailed diagram of a portion of "A" shown in FIG. 1.

In the present embodiment, while forming the trench 400 having a width of less than 30 μm through the sawing process, there can be a positional error, z in FIG. 3, up to 10 μm for the location of the trench 400. Accordingly, an excessive optical loss can be generated by the positioning error of the thin film filter inserted into the trench.

However, in the present invention, the second optical waveguide 250 is formed as a wide multi-mode waveguide. Thus, even when there is a positioning error of the thin film filter 450, the optical signal can be transmitted to the light-receiving unit 350 with little loss. In other words, since the second optical waveguide 250 is formed as the multi-mode waveguide having a width of 10 to 40 μm, the optical signal reflected at the thin film filter 450 may be incident to the second optical waveguide 250 with little loss. The affordable range of the location at which the trench 400 is formed can be varied according to the angle 2θ between the first and second optical waveguides 210 and 250. The range becomes narrower with the larger angle.

Further, in the present invention, it is desirable that a light-receiving device having a large light-receiving region be employed with a large width W2 of the second optical waveguide 250 as the light-receiving unit 350 connected hereto.

Figure 4A:
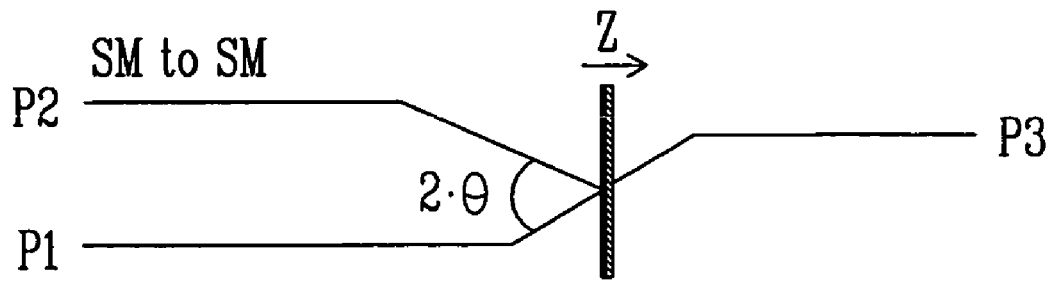
FIGS. 4A to 4C show experimental waveguides to test the variation of optical loss induced by the positioning error z of the filter depending on the waveguide schemes.
Figure 4B:
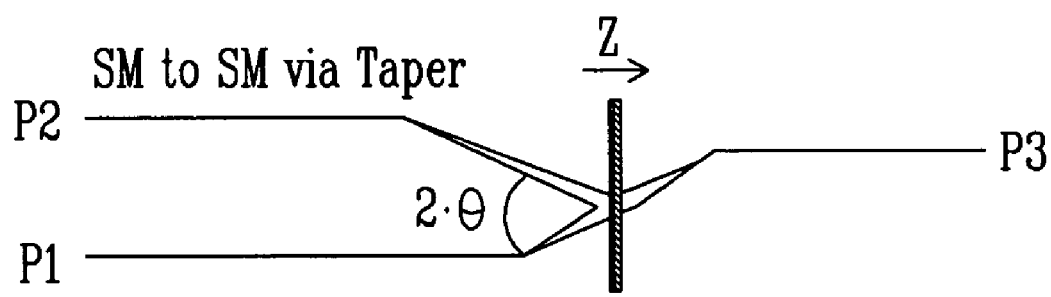
Figure 4C:
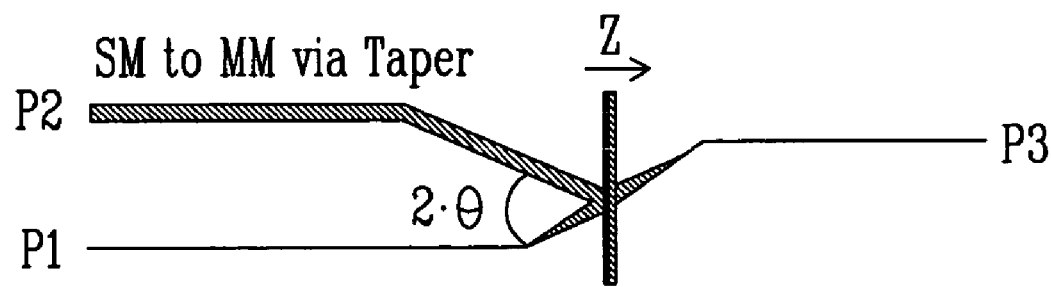

The singlemode waveguide near the joint can be formed as a tapered waveguide as in FIG. 4C to decrease the transmission loss through the trench by reducing diffraction loss with wide tapered waveguide.

FIGS. 4A to 4C show experimental waveguides to test the variation of optical loss induced by the positioning error z of the filter depending on the waveguide schemes, (A) a normal single-mode waveguide intersection, (B) a waveguide taper intersection, and (C) a singlemode-to-multimode intersection. The incidence angle θ is 8 degree. An SMF is connected to P1, and an MMF is connected to P2. SM represents for singlemode and MM for multimode.

Figure 5:
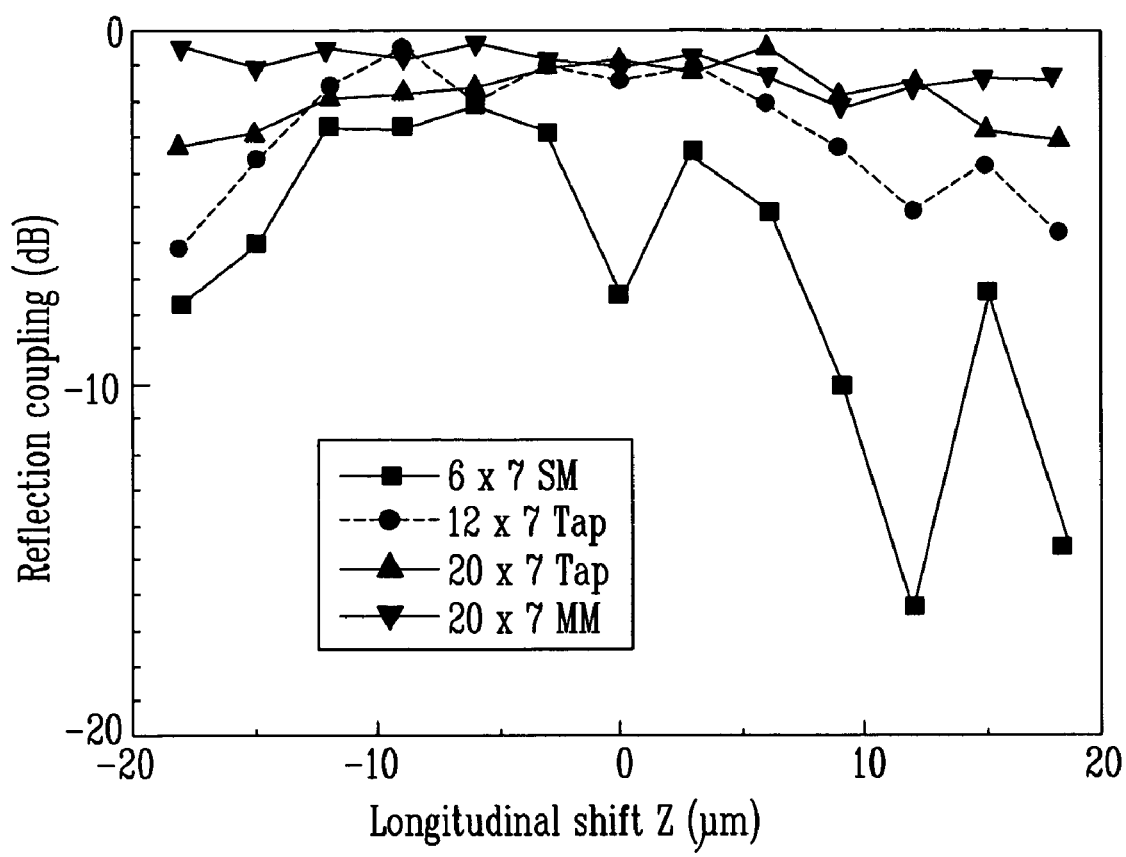
FIG. 5 shows an experimental result that showing the singlemode-to-multimode intersection in the best in tolerance to the positional errors.

FIG. 5 shows the experimental result that showing the singlemode-to-multimode intersection in the best in tolerance to the positional errors.

The variation of reflection coupling depending on the relative longitudinal position of TFF, z, for each case of the 6×7 μm singlemode intersection (6×7 SM), the 12×7 μm tapered waveguide intersection (12×7 Tap), the 20×7 μm tapered waveguide intersection (20×7 Tap), and the singlemode-to-multimode intersection (20×7 MM), respectively. The vertical scale in the figure is for the reflective coupling induced by the TFF, excluding the fiber-coupling loss and the intrinsic waveguide loss from the total insertion loss from P1 to P2.

Figure 6:
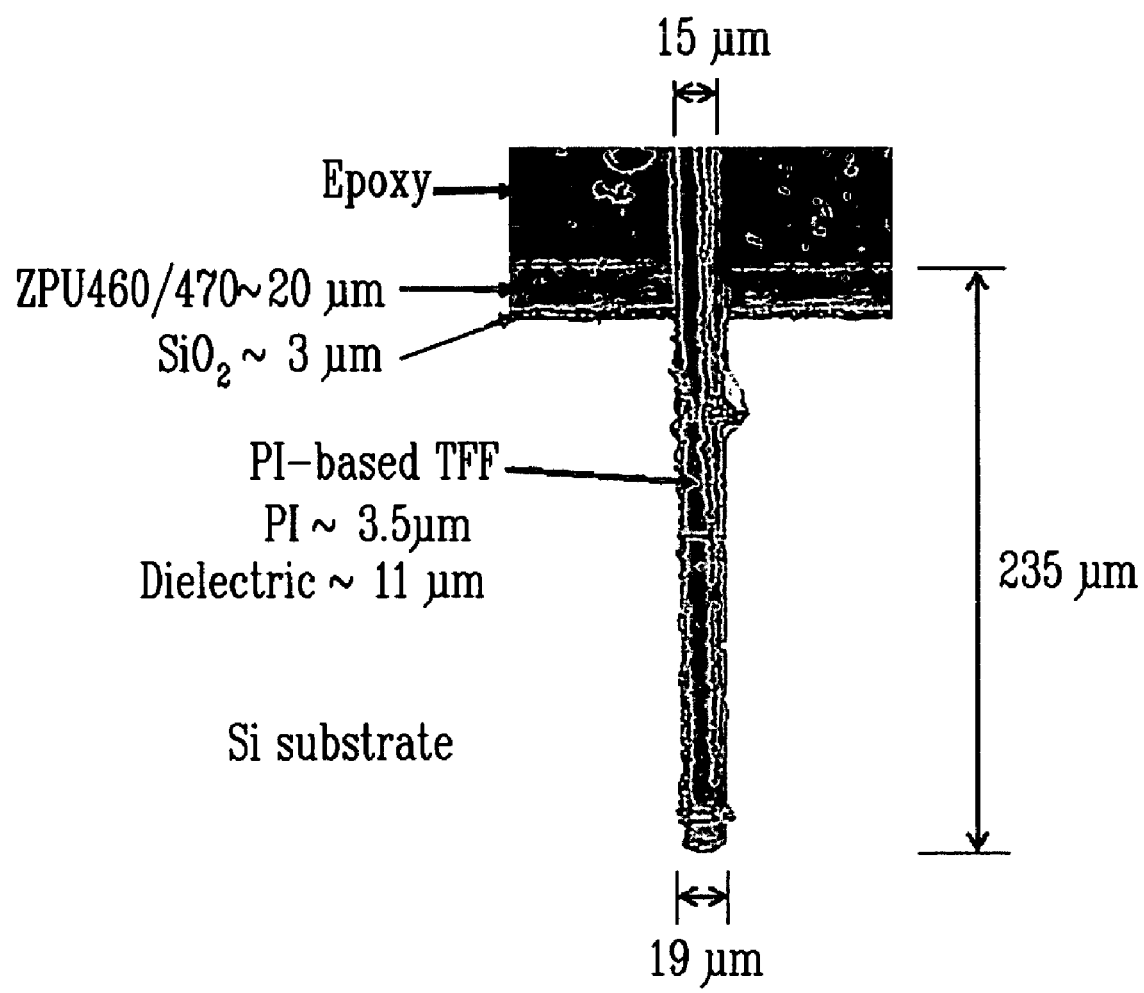
FIG. 6 shows a cross sectional view of the filter embedded sample.

FIG. 6 shows the cross sectional view of a TFF-inserted trench. PI represents polyimide.

Figure 7:
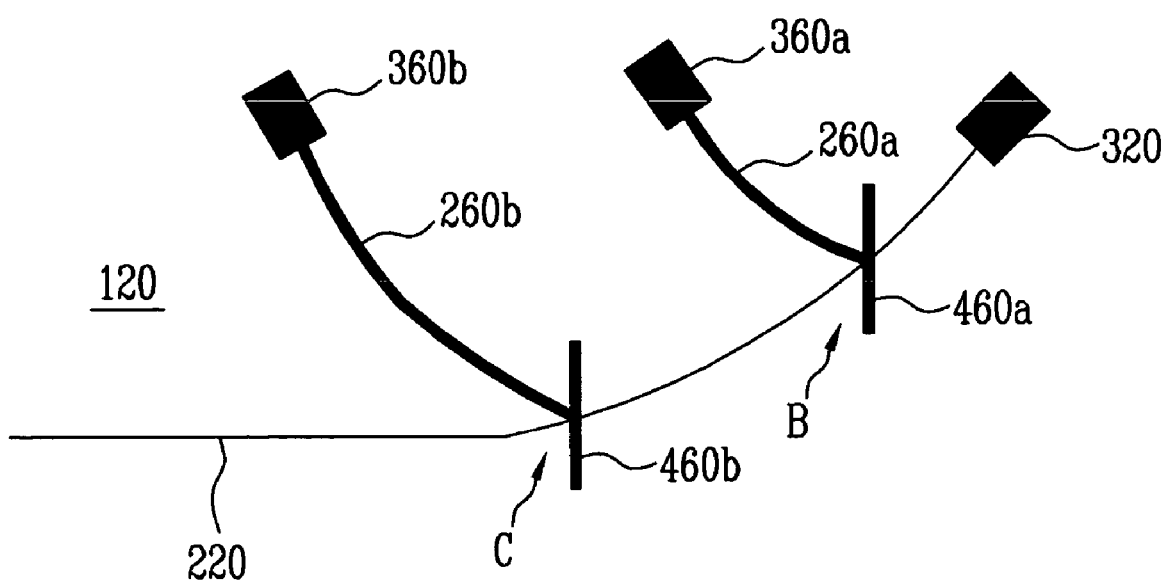
FIG. 7 is a schematic diagram for illustrating a planar lightwave circuit (PLC) type optical transceiver module according to another embodiment of the present invention.

FIG. 7 is a schematic diagram for illustrating a planar lightwave circuit (PLC) type optical transceiver module according to another embodiment of the present invention.

The planar lightwave circuit type optical transceiver module according to the present embodiment, which is a triplex one that uses one upstream wavelength and more than two downstream wavelengths, is integrated into a substrate 120 made of semiconductor or ceramic material. Light-emitting units 320 are arranged on one side of the substrate 120, and first and second light-receiving units 360a and 360b are arranged on the other side. In addition, a first optical waveguide 220 is formed on the substrate 120 to face the light-emitting unit 320, and second and third optical waveguides 260a and 260b are formed to face the first and second light-receiving units 360a and 360b. Here, the second optical waveguide 260a and the third optical waveguide 260b are adjacent to each other at predetermined portions (B and C portions) with a constant gap, respectively, and thin film filters 460a and 460b for transmitting or reflecting optical signals according to a wavelength is arranged at the portions (B and C portions) where the first optical waveguide 220 and the second optical waveguide 260a and the first waveguide 220 and the third optical waveguide 260b are adjacent. The thin film filters 460a and 460b are inserted into a trench (not shown) having a predetermined depth formed on the substrate 100 through a sawing process.

The light-emitting unit 320 includes a light-emitting device such as a laser diode and a monitoring diode such as a monitoring photodiode for monitoring laser, and the first and second light-receiving units 360a and 360b include light-receiving devices 330 such as photodiodes.

Each of the first, second and third optical waveguides 220, 260a and 260b has a clad made of silica or silica and polymer. The waveguides are formed on the substrate 120, and a core formed in a rectangular cross section. Here, a width of the first optical waveguide 220 formed in a single mode waveguide is approximately 2 to 10 μm, and widths of the second and third optical waveguides 260a and 260b formed in multi-mode waveguides are approximately 10 to 40 μm. In addition, the first optical waveguide 220 and the second and third optical waveguides 260a and 260b are arranged to have an angle 2θ of 16 to 90 degrees.

The first optical waveguide 220 and the second and third optical waveguides 260a and 260b do not contact with each other at the adjacent portions (B and C portions) but separated by a constant gap. Here, the separated gap is preferably 3 to 10 μm.

The thin film filters 460a and 460b have thickness of 10 to 30 μm. In addition, the trench into which the thin film filters 460a and 460b are inserted has a depth of approximately more than 100 μm, and preferably, 100 to 300 μm and a width of the trench is formed such that it is larger than the thickness of the thin film filters 460a and 460b by 2 to 10 μm, so as to be, for example, 12 to 40 μm.

The first light-receiving unit 360a receives a downstream signal in an Enhancement-band (1550 to 1560 nm) specialized and expected for use for image and voice analog signals in the BPON, the second light-receiving unit 360b receives a normal data signal in a band of 1480 to 1500 nm, and the light-emitting unit 320 emits an upstream signal in a band of 1260 to 1360 nm.

The analog downstream signal has a light-receiving signal of the minimum power level of −10 dBm larger than the normal data signal of the power level from −24 to −4 dBm. Therefore, the required minimal crosstalk of the data signal of 1480 to 1500 nm into the analog-band is about −20 dB. The required minimal crosstalk of the analog signal to the digital data band is about −40 dB. For the thin film filter typically used, a ratio of the crosstalk according to the wavelength is about −40 dB. According to the present invention, the analog downstream signal is connected to the second optical waveguide 260a to satisfy the crosstalk condition. In other words, the thin film filter 460a with which the optical signal in a wavelength range of 1260 to 1500 nm is transmitted, and the optical signal in a wavelength range of 1550 to 1560 nm is reflected is inserted into a trench of the portion (B portion) where the first optical waveguide 220 and the second optical waveguide 260a are adjacent. The thin film filter 460b transmitting from 1260 to 1310 nm and reflecting from 1480 to 1500 nm, is inserted into the trench of the portion (C portion) where the first optical waveguide 220 and the third optical waveguide 260b join.

In this arrangement, the widths of the second and third optical waveguides 260a and 260b connected to the first and second light-receiving units 360a and 360b are formed larger than that of the first optical waveguide 220, so that the loss of the optical signal due to an alignment error of the thin film filters 460a and 460b can be effectively prevented while effectively maintaining the ratio of the crosstalk required by the wavelength. In addition, the light-emitting unit 320 and the first and second light-receiving units 360a and 360b do not face each other, but are arranged in an angle of more than 30 degrees, and preferably 30 to 90 degrees, so that the ratio of the crosstalk for which the optical signal emitted from the light-emitting unit 320 is directly transmitted to the light-receiving units 360a and 360b can be reduced.

According to the present invention as described above, for a diplex optical transceiver module that uses different wavelengths in upstream and downstream, an optical waveguide connected to a light-receiving unit is a multi-mode waveguide and an optical waveguide connected to the light-emitting unit is a single mode waveguide (it is possible not to be exactly single mode but a slight multimode condition if it can provide a reasonable coupling loss of the light-emitting unit into optical fiber). In addition, there can be a tapered waveguide, whose width is broadened approaching the intersections, to minimize a diffraction loss as in FIGS. 4A to 4C. In addition, for a triplex optical transceiver module that uses one upstream wavelength and more than two different downstream wavelengths, an optical waveguide connected to the light-receiving unit is a multi-mode waveguide and an optical waveguide connected to the light-emitting unit is a single mode waveguide. Thus, even when there is a positioning error of a thin film filter due to an inaccuracy in forming a trench, the optical waveguide connected to the light-receiving unit is formed wider than the optical waveguide connected to the light-emitting unit so that the loss during transmission of the optical signal to the light-receiving unit is minimized. Therefore, the optical transceiver module is easily fabricated so that the throughput can be increased. Thus, the cost of the optical transceiver can be effectively reduced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A planar lightwave circuit type optical transceiver module comprising:
    a substrate;
    a light-emitting unit and a light-receiving unit arranged on the substrate;
    a single mode first optical waveguide having a core and a clad, and formed on the substrate to face the light-emitting unit;
    a multimode second optical waveguide having a core and a clad, and formed on the substrate to face the light-receiving unit; and
    a filter located at a portion at which the first optical waveguide and the second optical waveguide join with a gap without a direct contact between them, for transmitting or reflecting an optical signal according to a wavelength,
        wherein the second optical waveguide has a larger core height than that of the first optical waveguide, and
        wherein the light-receiving unit is a waveguide-type photo diode.

2. The planar lightwave circuit type optical transceiver module according to claim 1, wherein the second optical waveguide has a larger core width than that of the first optical waveguide.

3. The planar lightwave circuit type optical transceiver module according to claim 1, wherein the gap of 3 to 10 μm is located between the first optical waveguide and the second optical waveguide.

4. The planar lightwave circuit type optical transceiver module according to claim 1, wherein the filter is inserted into a trench formed on the substrate.

5. The planar lightwave circuit type optical transceiver module according to claim 4, wherein the trench is formed to have a depth of 100 to 300 μm and a width of 10 to 40 μm.

6. A planar lightwave circuit type optical transceiver module comprising:
    a substrate;
    a light-emitting unit arranged on the substrate;
    a plurality of light-receiving units arranged on the substrate;
    a single mode first optical waveguide having a core and a clad, and formed on the substrate to face the light-emitting unit;
    a plurality of multimode second optical waveguides, each having a core and a clad, and formed on the substrate to face the plurality of light-receiving units; and
    a plurality of filters, each filter located at a portion at which the first optical waveguide and the second optical waveguide are joined with a gap without a direct contact between them, for transmitting or reflecting an optical signal according to a wavelength,
        wherein the second optical waveguide has a larger core height than that of the first optical waveguide, and
        wherein the light-receiving unit is a waveguide-type photo diode.

7. The planar lightwave circuit type optical transceiver module according to claim 6, wherein the light-emitting unit emits an optical signal in a wavelength range of 1260 to 1360 nm, and wherein the plurality of light-receiving units receive optical signals in a wavelength range of 1550 to 1560 nm and 1480 to 1500 nm.

8. The planar lightwave circuit type optical transceiver module according to claim 6, wherein the plurality of light-receiving units are arranged to maintain an angle of 30 to 90 degrees with respect to the light-emitting unit.

9. The planar lightwave circuit type optical transceiver module according to claim 6, wherein the second optical waveguide has a larger core width than that of the first optical waveguide.

10. The planar lightwave circuit type optical transceiver module according to claim 6, wherein the second optical waveguide has a larger core thickness than that of the first optical waveguide.

11. The planar lightwave circuit type optical transceiver module according to claim 6, wherein the gap formed between the first optical waveguide and the second optical waveguide is in the range of 3 to 10 μm.

12. The planar lightwave circuit type optical transceiver module according to claim 6, wherein the filter is inserted into a trench formed on the substrate.

13. The planar lightwave circuit type optical transceiver module according to claim 12, wherein the trench is formed to have a depth of 100 to 300 μm and a width of 10 to 40 μm.

* * * * *